UNITED STATES PATENT OFFICE.

WILLIAM COFFIN, OF GLENDALE, NEW JERSEY, ASSIGNEE OF CHARLES F. A. SIMONIN AND EDWARD W. COFFIN.

IMPROVED PROCESS OF EXTRACTING FATTY SUBSTANCES.

*Specification forming part of Letters Patent No.* 102,166, *dated April* 19, 1870; *reissue No.* 4,067 *dated July* 12, 1870.

*To all whom it may concern:*

Be it known that CHARLES F. A. SIMONIN, of the city of Philadelphia, in the State of Pennsylvania, and EDWARD W. COFFIN, of Glendale, Camden county, New Jersey, did invent a new and Improved Process of Extracting Fatty Substances, whereof the following is a full, clear, and exact description, which will enable others skilled in the art to which it appertains to practice the said invention.

This invention has reference to the cleaning of wool, hair, hides, fur, feathers, and similar substances, by removing the natural oil or grease preparatory to spinning, dyeing, or any other manufacture; to the removal of oil or grease from all kinds of stuffs and fabrics; to the cleaning of cotton or woolen waste; to the preparation of anatomical specimens; and to many various other manufactures which require the extraction of fatty matters.

Take any of the lighter hydrocarbons produced by the distillation of petroleum or coal, such as naphtha, benzine, benzole, or gasoline, and apply the vapor thereof to the substance from which the oil or grease is to be extracted. For this purpose the hydrocarbon is distilled and the vapor passed upward through the said substance, which is laid on racks or on a grating.

That part of the vapor which takes up the oil or fat is deposited below in a receiver as a liquid hydrocarbon holding the oil or fat in solution. This liquid is then redistilled, leaving the oil or fat in the bottom of the still.

The hydrocarbon thus separated from the grease is passed into a condenser, after which it is ready to be used again; or it may be used immediately on a fresh portion of the substance which is to be freed from fat without previously condensing it.

That portion of the vapor which has passed through the said substance without taking up any oil or grease, and which has consequently not been condensed, may be either condensed or immediately used again.

By means of this process the natural oil or fat of wool, hair, &c., is saved, and may be purified and used for mercantile purposes.

This process is also more effective than that of washing the substance to be cleaned in the liquid hydrocarbon, as the vapor pervades all parts of the wool, hair, &c., much more thoroughly than the liquid can. This process also requires no mechanical arrangement for washing, which must be employed when the liquid is used.

Again, wool and hair are much more thoroughly cleaned by this process than by the alkaline treatment commonly in use, which frequently leaves so much oil in the wool that it will not take the desired color, and the dyer is obliged to rewash it.

This process is also applicable to the cleaning of cotton waste, or other substances from which it is desirable to extract petroleum-oil, or any of the heavier hydrocarbons, these oils being dissolved by the vapor of the light hydrocarbons, and then separated therefrom by redistillation, as described above.

What is claimed herein as the invention of CHARLES F. A. SIMONIN and EDWARD W. COFFIN is—

The above-described process of extracting fatty substances by means of the vapor of the lighter hydrocarbons distilled from petroleum or coal, such as naphtha, benzine, benzole, or gasoline.

WM. COFFIN.

Witnesses:
WM. J. BURNS,
WM. R. WRIGHT.